J. OGG.
CANE UNLOADER.
APPLICATION FILED OCT. 15, 1912.
1,059,312.
Patented Apr. 15, 1913.
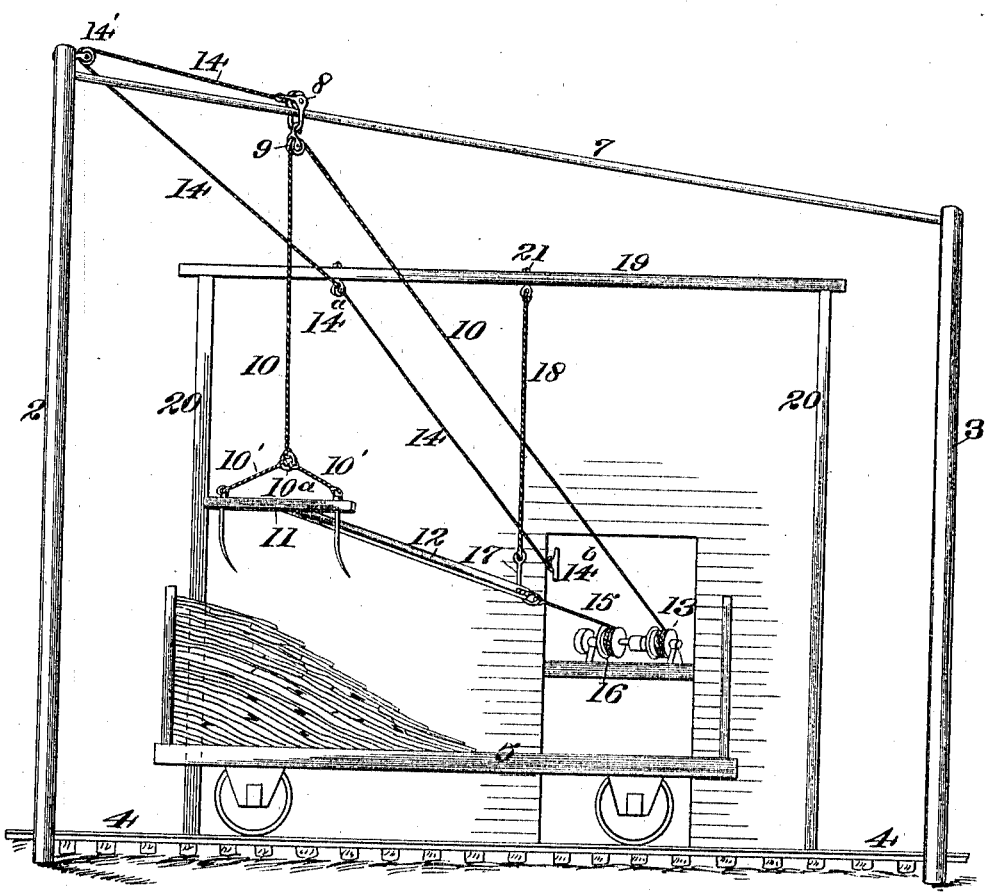
WITNESSES:
Charles Pickles
F. E. Maynard.
INVENTOR
James Ogg,
BY G. H. Strong.
ATTORNEY

UNITED STATES PATENT OFFICE.

JAMES OGG, OF PAHALA, TERRITORY OF HAWAII.

CANE-UNLOADER.

1,059,312.  Specification of Letters Patent.  Patented Apr. 15, 1913.

Application filed October 15, 1912. Serial No. 725,813.

*To all whom it may concern:*

Be it known that I, JAMES OGG, a subject of the King of Great Britain, residing at Pahala, Province of Kau, and Territory of Hawaii, have invented new and useful Improvements in Cane-Unloaders, of which the following is a specification.

This invention relates to a mechanism for unloading cane and other materials from a railway car or other vehicle.

The object of this invention is to provide a practical, simple, and easily operated unloader in which provision is made for the adjustment of the unloading fork or rake to operate over the entire length of the car without moving or changing the supporting means or derrick for the fork or rake, or having to move the car or train of cars.

The invention consists in the combination of a rake of suitable construction with supporting and manipulating means enabling a practically universal adjustment of the rake with relation to a vehicle carrying the material to be unloaded.

The figure is a perspective of the invention.

The present invention is designed especially for use on sugar plantations whereby the load of cane on a car or train of cars may be quickly and safely unloaded.

In its illustrated embodiment my invention is shown as comprising a pair of uprights 2 and 3, arranged adjacent a railway track 4, upon which may run cars 5 from which the cane is to be unloaded. The uprights or standards 2 and 3 are of different lengths, and the upper ends of the same are connected by an inclined bar or track rail 7, upon which may run a traveler 8 to which is connected a block 9, over which runs a hoisting rope 10 connected to a fork or rake 11 having a handle 12 of considerable length. The rope 10 connects to the toothed end of the rake or fork, and after passing through block 9, runs to a suitable type of winding drum or hoist, indicated at 13, whereby the rake may be raised or lowered over the load of cane on the car 5. The carrier 8 is adjustable on the overhead inclined track way 7 by means of a rope 14, which passes lengthwise along track way 7 to a guide pulley 14′ and thence through a suitable guide pulley 14ª to a cleat 14ᵇ within convenient reach of the operator in charge.

The free end of the handle 12 of the rake is connected to an actuating cable 15, which runs to a winding drum 16 of hoist 13 by which the rake may be hauled in when engaged with the load to drag the latter from the car; the rake handle 12 being suspended at the same end to which cable 15 attaches by link rod 17 and chain or rope 18, which latter is connected to the top rail 19 of a supporting frame 20, erected parallel with the uprights 2—3 and on the opposite side of the railroad track.

In operation, when a loaded car, as 5, has been moved into position along the tracks 4 and stands adjacent the uprights 2—3, the operator then slacks up the cable 10 from its drum 13 allowing the rake 11 to drop over the load of cane on the car; the position of the rake lengthwise over the car being controlled by means of the traveler 8 and rope 14. When the latter is drawn in it tends to haul the traveler 8 up the inclined rail 7, and when slackened to permit it to gravitate down the same. The effect of this adjustment of the traveler is to shift the rake 11 lengthwise of the car or cars standing between the upright posts 2 or 3, so that the rake will fall onto the load of cane at any desired point. Having lowered the rake 11 onto the load by means of the cable 10 and having positioned it through the control of the traveler 8 by the rope 14, then the haul rope 15 is tightened up by means of its drum and the load pulled by the rake from the car; meanwhile the rear end of the rake bar 12 is suspended and free to swing by reason of the flexible suspending connection 18 from the bar 17. From this it will be seen that I have provided an unloader which may be readily adjustable longitudinally of the car to unload any portion thereof, as desired; and by means of the suspending cable 18 the rake handle is supported so that the rake operates much like a hand rake and allows the unloader a wide range of action. The cable 18 has a fixed point of support 21 with bar 19 so that the free end of the rake handle may swing in circles about the point 21, irrespective of the position of carrier 8 or the inclination of the rake handle to the length of the car. The result being that the rake head can work the full length of a car or series of cars between posts 2—3, and yet the load will always be delivered at the same point.

The horizontal stability of the rake-head is measurably controlled by connecting the supporting cable 10 to the rake head by the forked chains 10' connected to ring 10ª to which the rope 10 is attached. The chains 10' serve to obviate the tendency of the rake to tilt transversely.

Having thus described my invention, what I claim and desire to secure by Letters Patent, is—

The combination in an unloading apparatus, of stationary supports carrying an inclined overhead track rail, a traveler movable along said track rail, a rake, a hoisting and lowering cable rove through the carrier and connected to the head of the rake, whereby the latter may be moved up or down and longitudinally, means for positioning the carrier upon the rail, and a haul rope connected to the rake for drawing the same to move its load.

In testimony whereof I have hereunto set my hand in the presence of two subscribing witnesses.

JAMES OGG.

Witnesses:
 HENRY GLASS,
 ANDREW M. PETERMAN.

---

Copies of this patent may be obtained for five cents each, by addressing the "Commissioner of Patents, Washington, D. C."